United States Patent [19]
Godwin et al.

[11] 3,927,555
[45] Dec. 23, 1975

[54] HYDROGEN DETECTOR SYSTEM

[75] Inventors: Stanley J. Godwin, Newtonville; Robert V. Klint, Rexford, both of N.Y.

[73] Assignee: General Electric Company, Schenectady, N.Y.

[22] Filed: Oct. 15, 1973

[21] Appl. No.: 406,163

[52] U.S. Cl. .................................................. 73/23
[51] Int. Cl. ............................................ G01n 31/06
[58] Field of Search .......... 73/23, 26, 19; 23/232 R, 23/254 R, 254 E; 340/237 R; 285/133 R, 140, 138

[56] References Cited
UNITED STATES PATENTS

| | | | |
|---|---|---|---|
| 1,467,911 | 9/1923 | Arendt et al. | 73/26 |
| 1,751,222 | 3/1930 | Styler et al. | 73/23 X |
| 2,293,019 | 8/1942 | Johnson | 73/23 X |
| 2,307,800 | 1/1943 | Norton | 73/26 |
| 3,284,165 | 11/1966 | Baumann et al. | 73/23 X |
| 3,489,518 | 1/1970 | Revell et al. | 73/23 X |
| 3,559,457 | 2/1971 | Collins | 73/23 |
| 3,605,484 | 9/1971 | Wunning | 73/23 |

*Primary Examiner*—Jerry W. Myracle
*Assistant Examiner*—Stephen A. Kreitman
*Attorney, Agent, or Firm*—Donald R. Campbell; Joseph T. Cohen; Jerome C. Squillaro

[57] ABSTRACT

A hydrogen sensor unit with a palladium alloy tube open at both ends that changes length reversibly dependent on hydrogen concentration has an improved mounting for substantially unconstrained volumetric change in all directions, so as to be usable with a large range of hydrogen concentrations. Both the inner and outer surfaces of the tube are contacted by the ambient atmosphere. Associated signal processing equipment continuously derives the percent hydrogen by volume. Applications include monitoring a nuclear reactor and a transformer tank for malfunctions.

11 Claims, 4 Drawing Figures

HYDROGEN DETECTOR SYSTEM

BACKGROUND OF THE INVENTION

This invention relates to a hydrogen gas sensor and detector system, and more particularly to an improved hydrogen sensor unit suitable for a large range of hydrogen concentrations and to a detector system with associated equipment for the continuous readout of percent by volume of hydrogen in an ambient atmosphere.

In the enclosed primary containment vessel of a nuclear reactor a fault condition caused, for example, by the cracking of the nuclear fuel rods, results in the dissociation of cooling water and the evolution of hydrogen gas. By monitoring the hydrogen concentration within the reactor vessel, the occurrence of a fault event can be indicated remotely and actuate an alarm when a predetermined hydrogen concentration is exceeded. Such an application may require detection of percentages by volume of hydrogen over the large range of ½ percent to 20 percent, which places severe demands on the hydrogen sensor unit. Hydrogen detectors also have utility for monitoring the increase in hydrogen in electrical transformer tanks, resulting from transformer malfunctions such as core and winding hot spots, arcing and corona which decompose transformer oil and solid hydrocarbon insulation and liberate hydrogen. The hydrogen gas accumulates gradually until the concentration becomes great enough to present an explosion hazard. There are numerous other applications for a hydrogen detector for indicating the presence and concentration of unwanted hydrogen or, less commonly, for gauging the amount of the gas in a mixture normally containing hydrogen.

U.S. Pat. No. 3,559,457 to R. L. Collins, assigned to the assignee of this invention, discloses a hollow tubular palladium alloy sensor which changes volume in the presence of hydrogen while being insensitive to other gases. The variation in axial length of the tubular sensing element is used as an indication of the hydrogen gas concentration in a transformer case to which the detector is attached for continuously monitoring the transformer for malfunctions. This hydrogen sensor is acceptable for some applications but has limitations as to others. For instance, the tubular sensing element is brazed to the detector unit bottom wall, and thus may crack and not give repeatable results as the element expands and contracts diametrically. Alternatively a gasket is used, but gaskets are prone to leakage. Further, the tubular sensing element is closed at one end to facilitate calibration, such that the inner and outer surfaces of the tube are exposed to different atmospheres. The sensing element is also directly in contact with the atmosphere above the transformer oil and may be coated with contaminants that come out of the oil and render the sensing element inactive. The present invention is directed to improvements in hydrogen detectors of this type, and particularly to a detector suitable for continuously measuring and recording a large range of hydrogen concentrations.

SUMMARY OF THE INVENTION

In accordance with the invention, the improved hydrogen sensor unit utilizes a palladium-silver or other palladium alloy tubular sensing element which is open at both ends and reversibly changes volume depending on the hydrogen concentration in the ambient atmosphere being analyzed. An important feature is that the tubular sensing element is supported for substantially unconstrained volumetric change in all directions, diametrically as well as lengthwise. A housing and heater assembly surrounds the tubular sensing element and supporting means and forms a chamber so that both the inner and outer surfaces of the element are contacted by the ambient atmosphere. The heater maintains a constant temperature and promotes the convective flow of ambient gas into and out of the sensor unit. In one embodiment for monitoring nuclear reactors for a fault event, the tubular sensing element is slipped over an axially extending shank and suspended by a single fastener providing a single point constraint so that the fatigue limit of the metal is not exceeded. A linear variable differential transformer detects the change in length of the tube. In a second embodiment for monitoring transformer tanks, the bottom end of the tubular sensing element is spring mounted on a rigid conical surface, and microswitches are used to indicate elongation of the tube corresponding to known hydrogen concentrations.

The complete hydrogen detector system may further include signal processing equipment for continuously generating a signal indicative of the percent by volume of hydrogen in the ambient atmosphere. This requires, in addition to the displacement transducer output signal, a signal indicative of the total pressure in the ambient atmosphere. A recorder can be provided, and also an alarm to be actuated at a predetermined hydrogen concentration.

DESCRIPTION OF THE PREFERRED EMBODIMENTS

Figure 1:
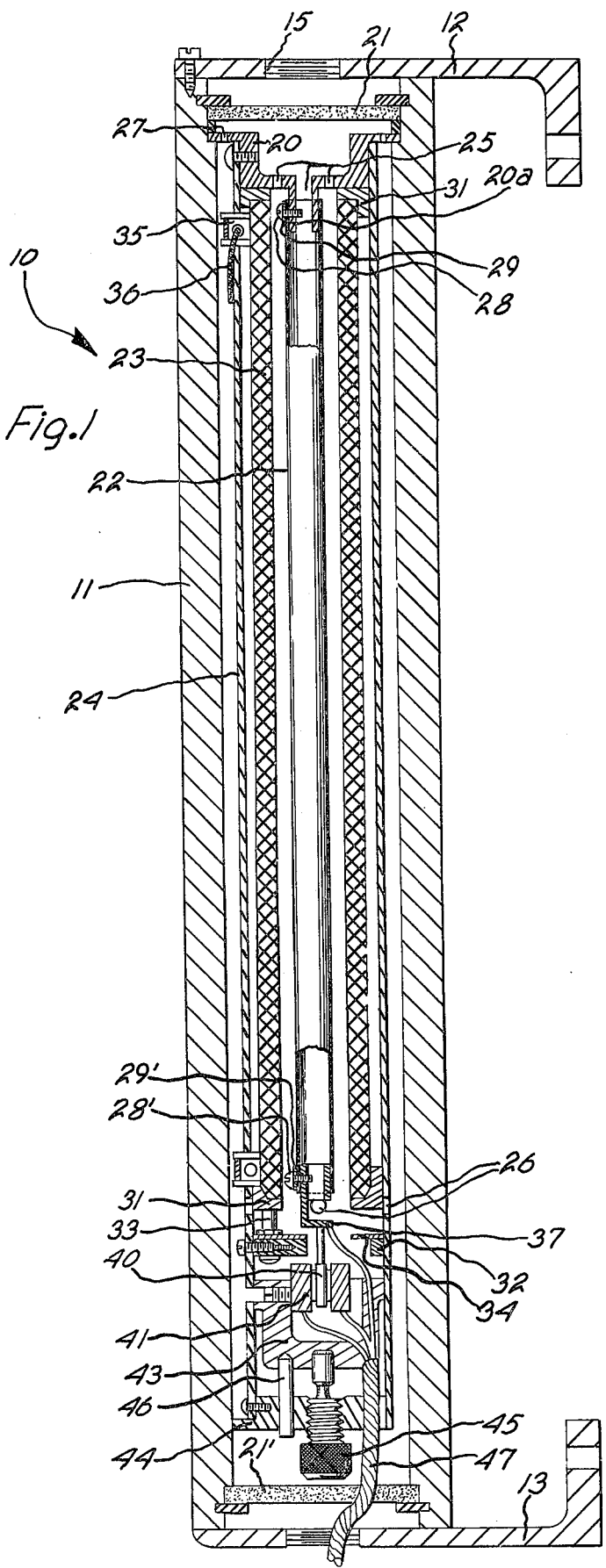
FIG. 1 is a diagrammatic longitudinal cross-sectional view of a hydrogen sensor unit suitable to be mounted on a vertical wall within the primary containment vessel of a nuclear reactor.
Figure 3:
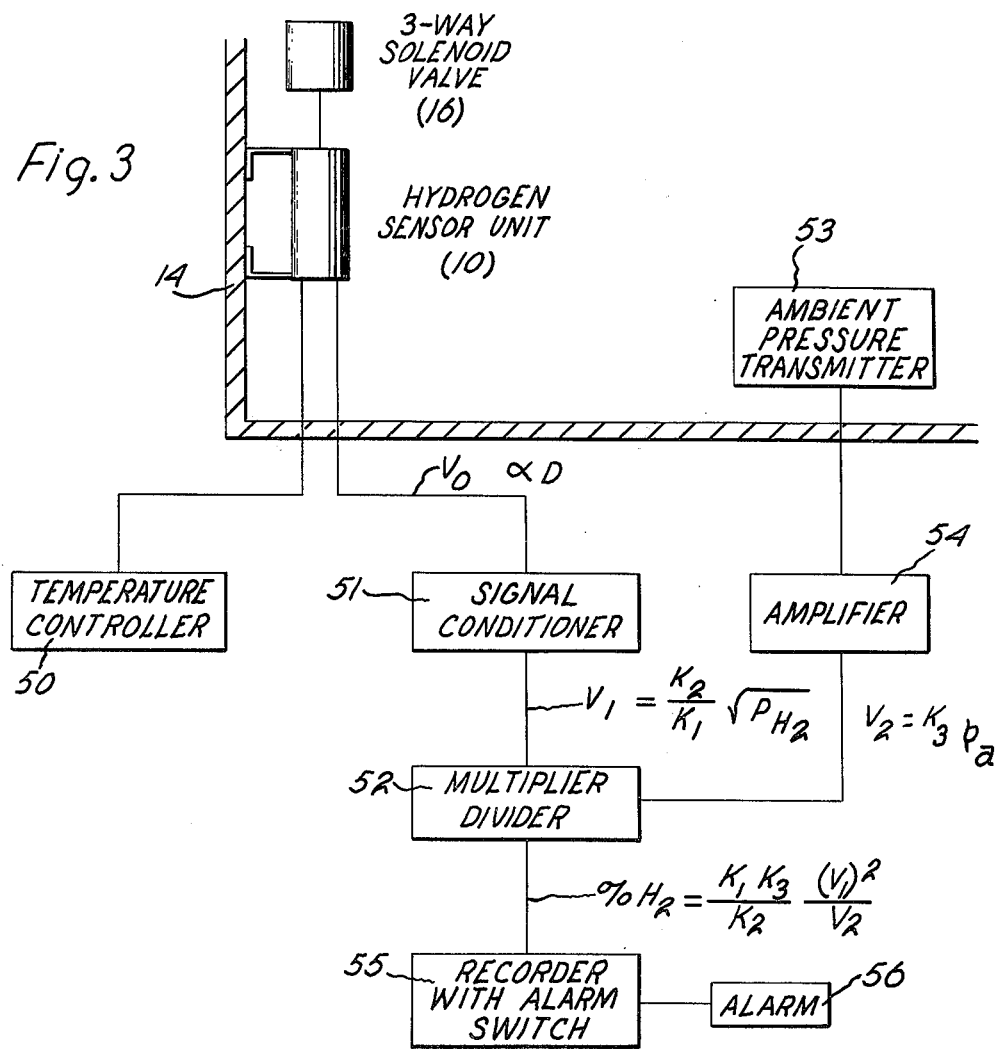
FIG. 3 is a block diagram of the signal processing circuitry and associated equipment used with the sensor unit of FIG. 1 to provide a complete hydrogen detector system capable of continuously reading out and recording, with an optional alarm output, the percent by volume of hydrogen in the ambient atmosphere.

The hydrogen sensor unit, indicated generally at 10 in FIGS. 1 and 3, is encased in a tubular metallic housing 11 having at either end a pair of L-shaped brackets 12 and 13 for mounting the unit on a vertical surface. In the preferred application for continuously monitoring the hydrogen concentration within the primary containment vessel of a nuclear reactor, the hydrogen sensor unit 10 is mounted permanently within the containment vessel 14 on one of the vertical walls. Typically, the tubular housing 11 is made of stainless steel with dimensions, by way of example, of a length of about 14 inches and an outer diameter of about 2 inches. The upper bracket 12 has a threaded aperture 15 for receiving a three-way selenoid valve 16. This valve is remotely controlled to admit ambient gas being analyzed to the interior of hydrogen sensor unit 10, and to alternatively admit calibrating gases from a source outside of the containment vessel 14 to the interior of the sensor unit. To calibrate the hydrogen detector, the sensor unit is first purged with nitrogen gas and is then calibrated using a mixture of hydrogen and nitrogen containing a known percentage of hydrogen. This calibration technique produces consistent and repeatable results.

Referring to FIG. 1, the upper end of housing 11 is machined to a larger inner diameter thereby providing a shoulder for supporting a tube holder 20 and an axially spaced flame arrester and filter 21, these parts being separated by a spacer and held in place by a retaining ring. The flame arrester and filter disk 21 can be made of porous sintered nickel and is permeable to the ambient gases while acting as a filter for contaminants from containment vessel 14 that may otherwise deposit on the surface of the palladium alloy sensing element and render it insensitive. Due to the presence of electrical components and connections within the hydrogen sensor unit 10 and the possibility of sparking which could ignite the hydrogen-containing ambient gas being analyzed, the flame arrester is essential to prevent the fire from spreading. At the other end of housing 11 is a similar flame arrester and filter 21'.

Tube holder 20 has a pair of coaxial, cylindrical surfaces for mounting or suspending a central tubular palladium alloy sensing element 22, a surrounding cylindrical resistance heating element 23, and an outer metallic mounting tube 24. Tube holder 20 further has a plurality of central apertures 25 for admitting the ambient atmosphere being analyzed for passage downwardly through the center of tubular sensing element 22 and in the annulus between the outer surface of the sensing element and the tubular resistance heating element 23. The ambient atmosphere then passes through holes 26 in the mounting tube 24, upwardly in the annulus between mounting tube 24 and housing 11, and out through a plurality of outer apertures 27 in tube holder 20. The exiting gas is returned to the containment vessel 14 through the three-way solenoid valve 16. Although the primary purpose of the tubular resistance element 23 is to maintain the palladium alloy sensing element 22 at a constant temperature, the convective flow of ambient gas as just described is due to the chimney effect generated by heating the central portion of the hydrogen sensor unit.

The tubular sensing element 22 is made of a palladium-silver alloy or other palladium alloy that exhibits a change in volume in the presence of hydrogen gas due to the diffusion of hydrogen atoms into the palladium metal. The change in volume is a function of the partial pressure of hydrogen in the ambient atmosphere, and of the temperature of the palladium. Palladium-silver alloys having a silver content of about 25 weight percent are preferred, but other percentages of silver can be used to obtain the desired moderating effect of hydrogen on the volumetric change of palladium. The change in volume takes place in all directions, diametrically as well as axially, and is reversible as the partial pressure of hydrogen varies. The palladium alloy sensing element responds to a wide range of hydrogen concentration, from 0.1 percent to as high as 20 percent for the nuclear reactor application. This detector is insensitive to total pressure, and can be used up to 5 atmospheres ambient pressure and a 15 psia partial pressure of hydrogen. Palladium and silver are both relatively resistant to radiation-induced transmutation, and the other materials in the sensor unit are selected to resist degradation caused by radiation. The thickness of the palladium-silver tubular element 22 depends upon the speed of response that is desired, and is suitably about 4 mils thick to obtain a response time of about 3–7 minutes for the nuclear reactor application. For the transformer application to be described later, a lower speed of response is sufficient so that a more rigid tube with a thickness of about 20 mils can be used.

An important feature of the invention is that the palladium alloy, hydrogen-sensitive, tubular sensing element 22 is supported for substantially unconstrained volumetric changes in all directions over its entire length. This is required for measuring a large range of hydrogen concentrations, such as up to 20 percent by volume, and produces superior results for a smaller range. As was previously mentioned, there is a change in the diametric dimension as well as the elongation of the tube 22, and these changes are reversible as the tube expands and contracts upon being exposed to different hydrogen concentrations. The palladium-silver element 22 is supported in such a way that the expansion of the tube with hydrogen adsorption does not cause the element to permanently yield, resulting in consistently repeatable and reversible elongation of the palladium-silver element 22 with varying hydrogen concentration. The technique used in the embodiment of FIG. 1 is a diameter-over-a-diameter with a single point constraint in the form of a single fastener at each end, while the FIG. 4 embodiment utilizes a rigid cone on which the bottom end of tube 22 rests.

Tube holder 20 (FIG. 1) has a central, depending cylindrical shank 20a over which the upper end of the palladium alloy tubular sensing element 22 is slipped. The outer diameter of the shank 20a is, to within a few ten thousandths of an inch, slightly smaller than the diameter of the tube 22 at room temperature. The single point constraint is provided by a single set screw 28 extending through a hole in the end of tube 22 into a threaded aperture in shank 20a. Desirably, a plastic washer 29 underlies the head of set screw 28. With this supporting arrangement, the palladium alloy tubular sensing element 22, which expands diametrically as well as longitudinally, is subjected to no stresses above the fatigue limit of the metal. Accordingly, the volumetric changes due to hydrogen absorption are repeatable and reversible. The only constraints to the tubular sensing element are localized in the immediate vicinity of the screw fastener 28. At the lower end of tube 22, a similar single point constraint is used to make connection to a coupling member used to couple the changes of elongation of the tube 22 to a displacement transducer. Thus, a tube extension 30 (see FIG. 2) has a cylindrical upper end that slips inside the end of tubular sensing element 22 and is retained by a single set screw 28' and plastic washer 29'.

Since the elongation of the palladium alloy tube 22 is also a function of the temperature, the tubular resistance heating element 23 is provided to maintain the sensing element at an approximately constant temperature. The temperature range at which the palladium alloy element is operated depends on the response and sensitivity requirement of the hydrogen sensor unit. For the nuclear reactor application, the tubular sensing element 22 is maintained at a temperature between 200°C–250°C and is calibrated to read hydrogen concentration directly. To physically mount the resistance heating element 23, each end of the heating element has a resistor guide 31 that is slidable within the mounting tube 24 and maintains clearance with respect to the concentric tubes 22 and 24. To support the resistance heating element assembly, a collar 32 is fastened to mounting tube 24 below tube extension 30 and has an upstanding screw 33 that extends into and supports the lower guide 31. The collar 32 desirably has an overlying heat shield 34. The resistance heating shield 23 further has a pair of tabs 35 for attachment of the energizing leads 36. A thermocouple 37 is used to sense the temperature of the tube extension 30, or more desirably the temperature of the tubular sensing element 22 directly, and controls the application of power to the resistance heating element 23 as will be described with reference to FIG. 3.

It will be noted that the housing, mounting, and resistance heating element components provide a housing and heater assembly that surrounds and mounts the tubular sensing element and provides passageways for the flow of the ambient atmosphere through the hydrogen sensor unit 10. The interior of the cylindrical resistance heating element 23 forms a chamber in which both the inner and outer surfaces of the tubular sensing element 22 are contacted by the ambient gas. Thus the partial pressure of hydrogen is the same on all the surfaces of the tubular sensing element. If the gases contacting the inner and outer surfaces of the sensor tube were different, the absorbed hydrogen atoms tend to diffuse until the partial pressures in both chambers are the same. In this housing and heater assembly the components are selected to make the possibility of electrical arcing unlikely. The heater element 23 is preferably coated with porcelain and the leads silver brazed. The thermocouple 37 is a low voltage, failsafe device.

Figure 2:
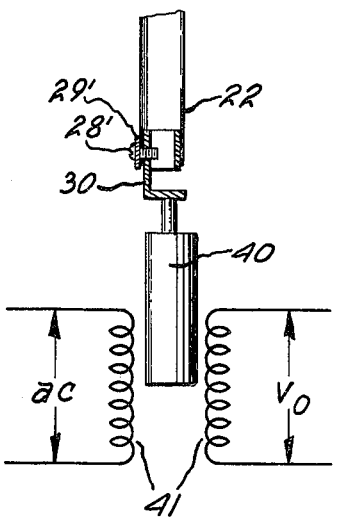
FIG. 2 is a schematic circuit diagram of the linear variable displacement transformer shown in FIG. 1.

The displacement transducer is a linear variable differential transformer for translating the elongation of the palladium alloy tubular sensing element 22 into a corresponding electrical signal voltage. The tube extension 30 provides a mounting for the rigid upper shank of a transformer core member 40 that is axially movable with respect to the stationary transformer windings 41. As shown in FIG. 2, a selected a-c voltage is supplied to the primary winding, and the output voltage $V_o$ varies with the axial position of the core member 40, which in turn depends upon the elongation of the tubular sensing element 22 and the partial pressure of hydrogen being sensed. The transformer windings 41 are preferably encapsulated and releasably secured to a transducer support 43 that is slidable within the mounting tube 24 for mechanical adjustment of the position of the transformer windings. To facilitate this arrangement, a tube end part 44 supports an adjusting screw 45 and guide pin 46 that both extend upwardly into the transducer support. A power cable 47 with connections to the transformer windings 41 and the thermocouple 37 passes through openings in the transducer support 43, the tube end 44, and the lower flame arrester and filter 21', and out the lower end of the hydrogen sensor unit 10. This cable might also include the resistance heating element wires 36.

The hydrogen detector system includes the remotely located equipment and electrical signal processing circuitry shown in FIG. 3. Supplied as part of the system is a temperature controller unit 50 of any suitable design, such as a solid state switching circuit operating on proportional control principles that is controlled by the thermocouple 37 or other temperature sensor inside the hydrogen sensor unit 10. For information on solid state proportional control, reference may be made to the "General Electric SCR Manual," 5th edition, copyright 1972, pages 327–329. The function of the signal processing circuitry is to process the output voltage $V_o$ of the linear variable differential transformer 40, 41, which is directly proportional to the displacement of the sensing element 22, into a d-c output voltage proportional to the hydrogen partial pressure. To understand the circuit components that are used, it is beneficial to review the theory of operation. The hydrogen sensing element 22 has a displacement related to the partial pressure of hydrogen being sensed. For the hydrogen concentrations of interest, $$P_{H_2} = K_1 D^2,$$

where $P_{H_2}$ is the partial pressure of hydrogen, $D$ is a relative displacement such as $\Delta L/L$, and $K_1$ is a constant. The linear variable differential transformer and associated signal conditioning module yield a d-c voltage output proportional to this displacement, or $$V_1 = K_2 D.$$

Substituting, $$V_1 = \frac{K_2}{K_1} \sqrt{P_{H_2}}.$$

To obtain a readout in percent hydrogen a measurement of total ambient pressure is required. If $V_2$ is a d-c output voltage from a suitable ambient pressure gage, then $$V_2 = K_3 p_a,$$

where $K_3$ is a gage constant and $p_a$ is the ambient pressure. In order to obtain a voltage proportional to percent hydrogen, it is necessary to process $V_1$ and $V_2$ to obtain $$V_3 = K_4(\%H_2),$$

where $$\%H_2 = \frac{P_{H_2}}{p_a},$$

or $$\%H_2 = \frac{K_1 K_3}{K_2} \frac{(V_1)^2}{V_2}.$$

Hence, the electrical signal processing requires squaring $V_1$, dividing it by $V_2$, taking a log of the ratio to obtain a linear display with percent $H_2$, and supplying enough gain for full scale deflection on a recorder with provision for a calibration adjustment.

Accordingly, the signal processing equipment includes the signal conditioner module 51 and a multiplier-divider circuit 52. The signal from a suitable ambient pressure gage and transmitter 53 is amplified by amplifier 54 before being supplied to multiplier-divider 52, the output from which is a d-c voltage representing percent by volume of hydrogen in the ambient atmosphere. To obtain a continuous visual record, a pen recorder 55 can be provided to trace a graph of percent hydrogen and trip an alarm switch to sound an alarm 56 or energize a warning light when a predetermined concentration is exceeded. Steps may then be taken to control the nuclear reactor. In view of the extensive foregoing discussion, no further description of the operation of the complete hydrogen detector system is necessary.

Figure 4:
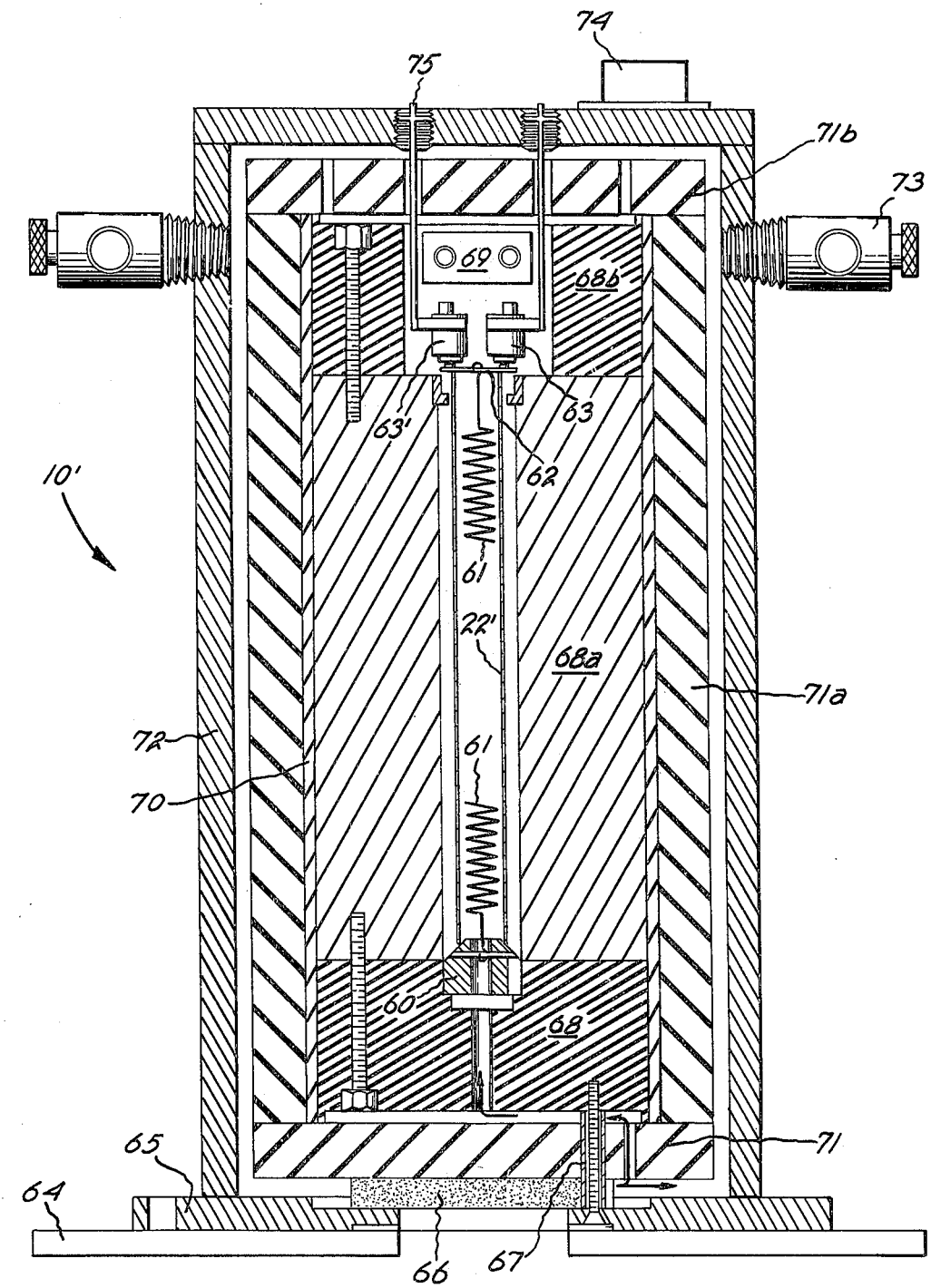
FIG. 4 is a diagrammatic longitudinal cross-sectional view of another embodiment of the hydrogen sensor unit for monitoring the buildup of hydrogen in a power transformer tank.

The second embodiment of the invention illustrated in FIG. 4 is suitable for the low cost, continuous monitoring of the buildup of hydrogen gas in an electric transformer tank. In oil-filled transformers, the measurement of hydrogen can be used to monitor products of the corona degradation of insulation, and other transformer malfunctions that result in the liberation of hydrogen gas are mentioned in the background of the invention. A low cost hydrogen sensor unit is appropriate for this application since it is supplied with and remains on each individual transformer. The basic palladium-silver tubular sensing element 22' is essentially the same, although the mounting of the tube for substantially unconstrained volumetric changes in all directions is different. In this embodiment the bottom end of the tube 22' is held down against a rigid conical surface by a spring running up the center of the tube. The metallic, conical center mount 60 is fixed rigidly in the center of the hydrogen sensor unit 10' as described in detail later, and has a central aperture and peripheral grooves for the passage of the ambient atmosphere being analyzed. The lower end of the spring 61 is fastened to the center mount 60 by a cross pin, and at the upper end the spring is fastened to a cross pin supported by an end cap 62 for the tube 22'. Thus, the sensor tube 22' has freedom to expand and contract diametrically on the rigid conical mounting surface, and likewise can expand and contract longitudinally without constraint. The output indication is in the form of a pair of microswitches 63 and 63' that are set to trip at two different, predetermined hydrogen concentration levels, such as 2 percent hydrogen by volume and 5 percent hydrogen by volume. The closing of an electrical circuit in this manner can energize an alarm or warning light on the transformer itself or at a suitable remote location. Since the response time can be relatively long as compared to the nuclear reaction application, the tubular sensing element 22' can have a greater thickness and be more rigid.

The remaining parts of the hydrogen sensor unit 10' will be described briefly. The transformer case 64 has an aperture communicating with a similar opening in a flat mounting plate 65. The opening in plate 65 is covered by a porous filter and flame arrester 66 through which the ambient gases are admitted to the interior of hydrogen sensor unit 10'. A plurality of upstanding bushings 67 support a lower heat sink cover 68 above the mounting plate 65 and is fastened thereto by screws extending through the bushings 67. Heat sink cover 68 has a circular recess in its upper face into which the center mount 60 is pressed. The aluminum heat sink further includes a central member 68a having a central bore defining a chamber through which the palladium alloy tubular sensing element 22' extends with provision for clearance so that the ambient gas circulates outside the tube as well as inside. The heat sink top cover 68b has a central bore for the microswitches 63 and 63', and for the mounting of a thermal switch 69 for controlling the application of power to the heating element. The resistance heating element 70 is in the form of a heater tape wrapped around the outside of the heat sink parts 68, 68a, and 68b, all of which form the heater assembly.

Foil/foam heat insulation entirely encases the heater assembly and includes a bottom cover 71, a central cylindrical member 71a, and a top cover 71b. Passageways are provided for the circulation of ambient atmosphere between the mounting plate 65 and the heat insulation cover 71, in the heat insulation cover itself, and in the lower heat sink cover 68. As is shown by the arrows, the natural convective flow of ambient gases passing through the porous filter 66 is through these connected passageways to a central bore in heat sink cover 68 connecting to the bore and peripheral grooves in the center mount 60. At the upper end of the tubular sensing element 22', the ambient gases being analyzed pass through the central bore in upper heat sink cover 68b and through passageways in the upper heat insulation cover 71b. A metallic housing 72 with a top cover completely encases the interior components of the hydrogen sensor unit with a clearance space providing additional passageways for the flow of ambient gases and the gases used to calibrate the unit. A pair of needle valves 73 screw into the housing 72 at either side to admit these calibrating gases and to serve as an exit for the ambient atmosphere just analyzed. The top cover of the housing 72 further receives an electrical connector 74 for the heating element and microswitch circuits, and has provision for mounting a pair of set point adjusting links 75 for the two microswitches 63 and 63'. As was mentioned axial expansion of the palladium alloy tubular sensing element 22' by two different predetermined amounts corresponding to different hydrogen concentrations are respectively indicated by the tripping of the microswitches.

In summary, an improved hydrogen sensor unit with a palladium alloy sensing element is constructed so as to be suitable for continuously monitoring a large range of hydrogen concentrations. Optional remotely located signal processing equipment can be supplied with the system to calculate and display the percent hydrogen by volume. Although numerous applications are possible, the monitoring of a nuclear reactor and a transformer tank for malfunctions have been discussed.

While the invention has been particularly shown and described with reference to several preferred embodiments thereof, it will be understood by those skilled in the art that various changes in form and details may be made therein without departing from the spirit and scope of the invention.

What is claimed is:
1. An improved hydrogen sensor unit comprising
   a palladium alloy tubular sensing element open at both ends which exhibits a reversible change in volume dependent upon the partial pressure of hydrogen in an ambient atmosphere being analyzed and which has a thickness selected to obtain a desired speed of response,
   supporting means for mounting said tubular sensing element for substantially unconstrained volumetric change in all directions over its entire length,
   a housing and heater assembly surrounding said tubular sensing element and supporting means and forming a chamber and passageways so that both the inner and outer surfaces of said tubular sensing element are contacted by the ambient atmosphere, and
   indication means responsive to the change in length of said tubular sensing element for indicating the presence of known concentrations of hydrogen.
2. An improved hydrogen sensor unit comprising
   a palladium alloy tubular sensing element open at both ends which exhibits a reversible change in volume dependent upon the partial pressure of hydrogen in an ambient atmosphere being analyzed, supporting means for mounting said tubular sensing element for substantially unconstrained volumetric change in all directions over its entire length, a housing and heater assembly surrounding said tubular sensing element and supporting means and forming a chamber and passageways so that both the inner and outer surfaces of said tubular sensing element are contacted by the ambient atmosphere, and indication means responsive to the change in length of said tubular sensing element for indicating the presence of known concentrations of hydrogen, wherein said supporting means includes an axially extending shank over which one end of said tubular sensing element is slipped, and a single point constraint in the form of a fastener for suspending said tubular sensing element from said shank.

3. A hydrogen sensor unit according to claim 2 wherein said indication means includes a linear variable differential transformer for producing an output voltage related to the change of length of said tubular sensing element as indicated by the position of a movable transformer core member, said supporting means further comprising a coupling member secured to said core member and connected to the other end of said tubular sensing element by a single point constraint in the form of a fastener for suspending said coupling member from said tubular sensing element.

4. An improved hydrogen sensor unit comprising a palladium alloy tubular sensing element open at both ends which exhibits a reversible change in volume dependent upon the partial pressure of hydrogen in an ambient atmosphere being analyzed, supporting means for mounting said tubular sensing element for substantially unconstrained volumetric change in all directions over its entire length, a housing and heater assembly surrounding said tubular sensing element and supporting means and forming a chamber and passageways so that both the inner and outer surfaces of said tubular sensing element are contacted by the ambient atmosphere, and indication means responsive to the change in length of said tubular sensing element for indicating the presence of known concentrations of hydrogen, wherein said supporting means includes a rigid mount having a conical surface, and yieldable means for holding one end of said tubular sensing element down against said conical surface.

5. A hydrogen sensor unit according to claim 4 wherein said indication means includes at least one microswitch mounted adjacent the other end of said tubular sensing element to be actuated by the elongation thereof.

6. A hydrogen sensor unit according to claim 1 wherein said housing and heater assembly comprises cylindrical resistance heating means concentric with the entire length of said tubular sensing element for maintaining an approximately constant temperature and promoting the convective flow of ambient gas past the inner and outer surfaces of said tubular sensing element.

7. A hydrogen sensor unit according to claim 6 wherein said housing and heater assembly further includes a flame arrester and filter at each end of said housing through which the ambient gas passes.

8. A hydrogen detector system comprising in combination a hydrogen sensor unit comprising a palladium-silver tubular sensing element that exhibits a reversible change in volume dependent upon the partial pressure of hydrogen gas in an ambient atmosphere being analyzed and that has a thickness selected to obtain a desired speed of response, supporting means for suspending said tubular sensing element by a single point constraint connection for substantially unconstrained volumetric change in all directions, a housing and heater assembly surrounding said tubular sensing element and having provision for exposing both the inner and outer surfaces of said tubular sensing element to the ambient atmosphere, and a displacement transducer responsive to the change in length of said tubular sensing element and producing an output signal indicative thereof, and signal processing equipment for continuously processing said displacement transducer output signal and an ambient pressure signal indicative of the total pressure of the ambient atmosphere to thereby obtain the percent by volume of hydrogen in the ambient atmosphere.

9. A hydrogen detector system comprising in combination a hydrogen sensor unit comprising a tubular sensing element that exhibits a reversible change in volume dependent upon the partial pressure of hydrogen gas in an ambient atmosphere being analyzed, supporting means for mounting said tubular sensing element for substantially unconstrained volumetric change in all directions, a housing and heater assembly surrounding siad tubular sensing element and having provision for exposing both the inner and outer surfaces of said tubular sensing element to the ambient atmosphere, and a displacement transducer responsive to the change in length of said tubular sensing element and producing an output signal indicative thereof, and signal processing equipment for continuously processing said displacement transducer output signal and an ambient pressure signal indicative of the total pressure of the ambient atmosphere to thereby obtain the percent by volume of hydrogen in the ambient atmosphere, wherein said signal processing equipment comprises means for deriving from said displacement transducer output signal a first signal indicative of the partial pressure of hydrogen in the ambient atmosphere, means for squaring said first signal and means for dividing the square of said first signal by said ambient pressure signal to obtain a second signal, and output indication means controlled by said second signal for indicating percent by volume of hydrogen in the ambient atmosphere.

10. A hydrogen detector system according to claim 9 wherein said output indication means comprises a recorder for continuously recording percent by volume of hydrogen, and an alarm that is actuated when a predetermined hydrogen concentration is exceeded.

11. A hydrogen detector system according to claim 9 wherein said hydrogen sensor unit further includes a temperature sensor for measuring the approximate temperature of said tubular sensing element, and said system further includes
   a temperature controller actuated by said temperature sensor for energizing said heater and maintaining said tubular sensing element at an approximately constant temperature.

\* \* \* \* \*